UNITED STATES PATENT OFFICE.

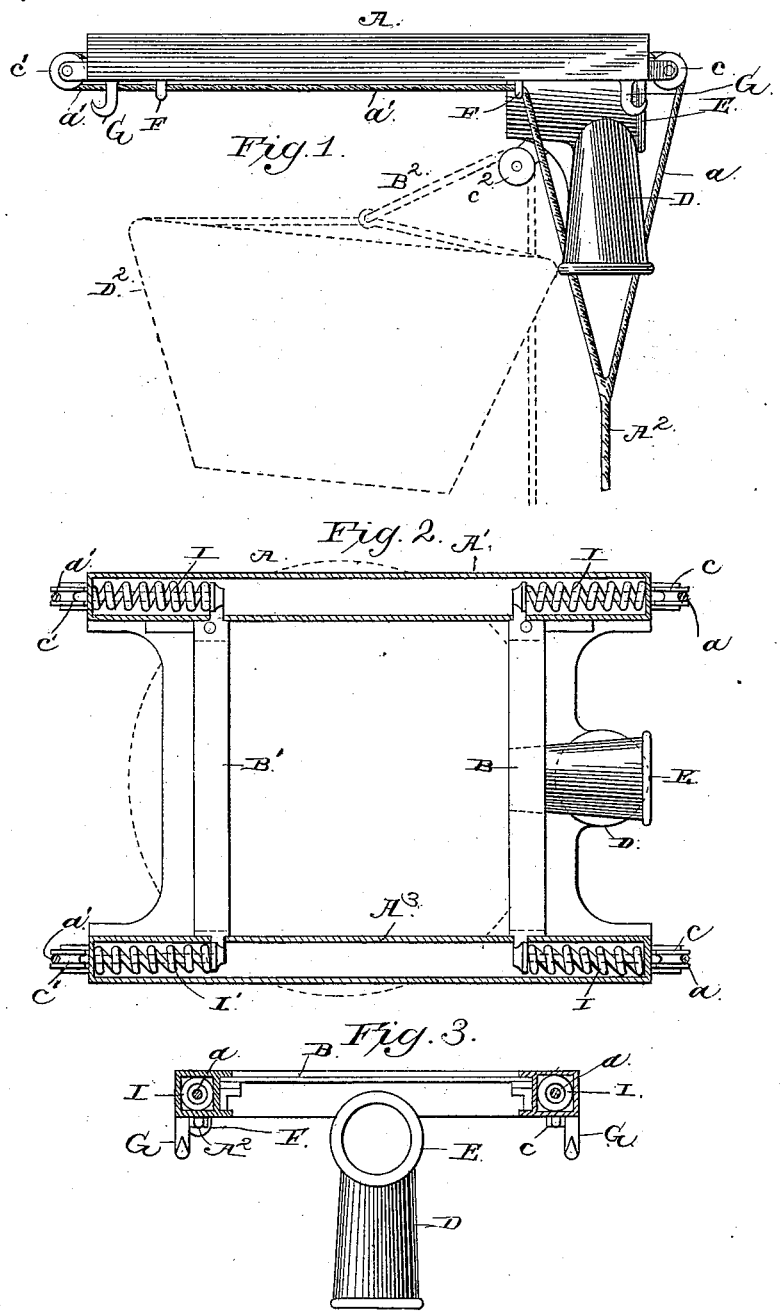

JOHN SCARSBROOK LANGHORNE, OF LYNCHBURG, VIRGINIA.

DEVICE FOR PICKING FRUIT, FLOWERS, &c.

SPECIFICATION forming part of Letters Patent No. 337,168, dated March 2, 1886.

Application filed July 15, 1885. Serial No. 171,719. (No model.)

*To all whom it may concern:*

Be it known that I, JOHN SCARSBROOK LANGHORNE, a citizen of the United States, residing at Lynchburg, in the county of Campbell and State of Virginia, have invented a new and useful Improvement in Devices for Picking Fruit, Flowers, &c., of which the following is a specification, reference being had to the accompanying drawings.

My invention relates to devices for picking fruit, flowers, &c.; and the object of my invention is to produce a fruit-picker by means of which the fruit or flowers may be readily severed from the branches without crushing or otherwise injuring the same.

To the above purposes my invention consists in certain peculiar and novel features of construction and arrangement, as hereinafter described and claimed.

In order that my invention may be fully understood, I will proceed to describe it with reference to the accompanying drawings, in which—

Figure 1 is a side elevation of my improved fruit-picker. Fig. 2 is a top view of the same with the cover removed from each of the spring-cases. Fig. 3 is an end elevation of the same with the end cover removed from both of the spring-cases.

In the said drawings, A designates an open frame of rectangular form, the two sides $A'$ $A^3$ of which are made hollow to contain each a pair of springs, I I', as shown.

B B' designate two knives, which are each secured at the ends to the two opposite springs, I, the arrangement being such that the springs act to force the two knives toward each other.

Each of the hollow or tubular side pieces, $A'$ or $A^3$, of the frame A has frictional guide-pulleys $c$ $c'$ mounted thereon at opposite ends thereof, and over these pulleys are arranged the branches $a$ $a'$ of operating-cords $A^2$, one of said cords being provided for each of the side pieces, $A'$ or $A^3$, of the frame. Each of the branches $a$ of the operating-cords $A^2$ passes over one of the pulleys $c$ into and through one of the coiled springs I, and is connected to one end of one of the laterally-movable cutting-blades B. The other branches, $a'$, of each of the operating-cords $A^2$ extend along the lower faces of one of the side pieces, $A'$ or $A^3$, of the frame and are supported and guided in loops or eyes F, secured to said side pieces, the branches $A'$ passing over the pulleys $c'$, thence back into and through the springs I' and connected to opposite ends of the remaining cutting blade or knife B'. Thus it will be seen that I provide two branched cords, $A^2$, one branch of each passing over a pulley, $c$, through a spring, I, and is attached to one of the knives B, and the other branch of each cord passes across the frame over a pulley, $c'$, back through a spring, I', and is attached to the other knife, B'.

The side pieces of the frame are constructed substantially alike, and they are each made hollow to receive the springs I and one end of the knives, against which the spring bears. The knives are movable toward and away from each other in guide-grooves in the side pieces of the frame, and they are thereby prevented from springing up out of place and guided in their lateral movements.

The action of the springs I I' tend to keep the knives closed, whereby when the pull or tension on the cords $A^2$ is released the knives return to their normal closed position. The operating-cords $A^2$ pass downward to within convenient reach of the operator. In lieu of having two branched cords, $A^2$, a single cord may be provided with four branches, thus providing a branch for each end of the knives B B' for simultaneously operating the same.

D E designate two sockets formed upon frame A and extending at right angles to each other from said frame. These sockets are designed to receive one end of a rod or staff upon which the device is to be supported. When the rod or staff is to be held vertically, it is inserted into socket D, and when said rod is to be held horizontally it is inserted into socket E.

Beneath frame A are formed or secured four or more hooks, G, which are designed to support a suitable bag or receptacle to receive the fruit, &c. A pulley, $c^2$, is also provided for the frame, so that when grapes are to be gathered a basket, $D^2$, may be used. In this instance the basket is secured to one end of a cord, $B^2$, which runs over pulley $c^2$ and down to within convenient reach of the operator. It will thus be seen that when the device is in use the fruit or flower is caused to enter the opening in the frame, the knives B B' being held away from each other by pulling upon cord A². As soon as said cords are released, the knives B B' are thrown together by the springs I I' and cut the stem, so that the fruit or flower falls into the receptacle. The device is extremely simple and reliable in operation, and is very durable.

Instead of using two knives, B B', I may employ only one knife. In such case the arrangement and construction would be substantially the same as shown in the drawings, with the exception that the knife would work entirely across the frame, and the cords A² would not be branched, as in the case where two knives are used. I therefore do not wish to be limited to the use of two or any number of knives.

Having thus described my invention, what I claim as new, and desire to secure by Letters Patent, is—

1. The combination, with a rectangular frame for supporting a receptacle, of the knives arranged transversely across and supported in the frame and movable laterally thereon, springs inclosed within the frame for normally closing the knives, and a cord connected to the knives for throwing them into operative position, substantially as described.

2. The combination of a rectangular frame for supporting a receptacle, the spring-actuated knives normally held in a closed position, said knives being guided and supported at their ends in the side pieces of the frame and movable laterally therein, and a cord passing through guides of the frame and connected to the knives for separating them, whereby when a pull on the cord is released the springs will force the knives together to sever the fruit or flower, substantially as described.

3. The combination, with a frame for supporting a receptacle, of the sliding knives supported in the frame, the springs bearing against the knives, and an operating-cord connected with the knives and passing through the springs, substantially as described.

4. The combination of the frame having the hollow side-pieces, laterally-movable knives mounted in the frame, coiled springs inclosed within the side pieces of the frame and bearing against the ends of the knives, and an operating-cord passing through the springs and connected with the knives for simultaneously operating the same, substantially as described.

5. The combination of the frame A and the springs I I' with the knives B B' and branched cords A², substantially as described.

6. The combination of the frame A, springs I I', pulleys mounted on the frame, sockets D E, knives B B', and operating-cords connected with the knives, substantially as described.

7. The frame A, in combination with the sliding knives B B', coiled springs acting against the same to retain them normally closed, pulleys on the frame, and cords A², having the branches $a$ $a'$ connecting with the knives passing through the springs and over the pulleys, substantially as described.

In testimony that I claim the foregoing as my own I have hereto affixed my signature in presence of two witnesses.

JOHN SCARSBROOK LANGHORNE.

Witnesses:
P. H. ROVER,
HENRY G. PIKE.